D. McD. SHEARER.
REVETMENT MOLD.
APPLICATION FILED AUG. 20, 1915.
1,173,880.
Patented Feb. 29, 1916.
2 SHEETS—SHEET 1.
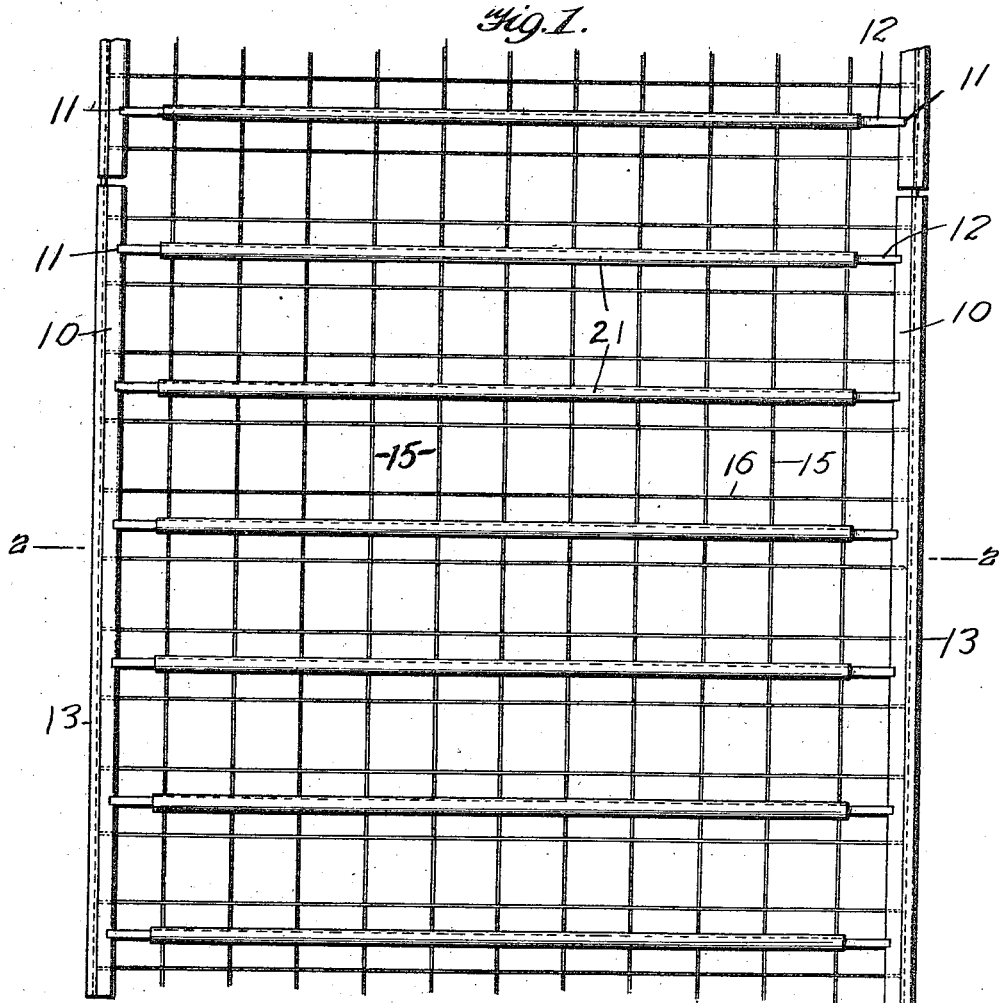
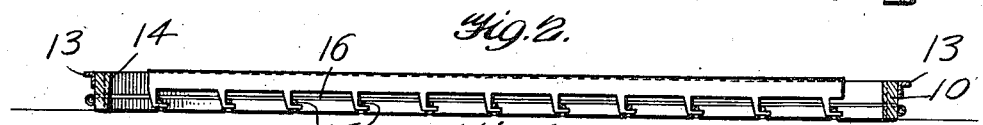
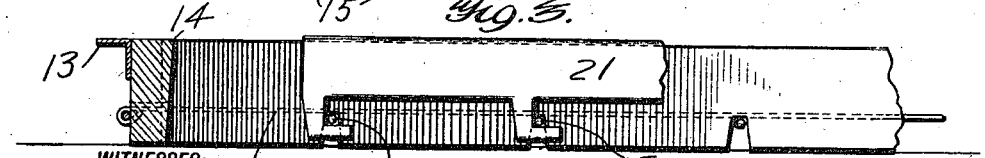
WITNESSES:
INVENTOR
David McD. Shearer,
BY Munn&Co
ATTORNEYS

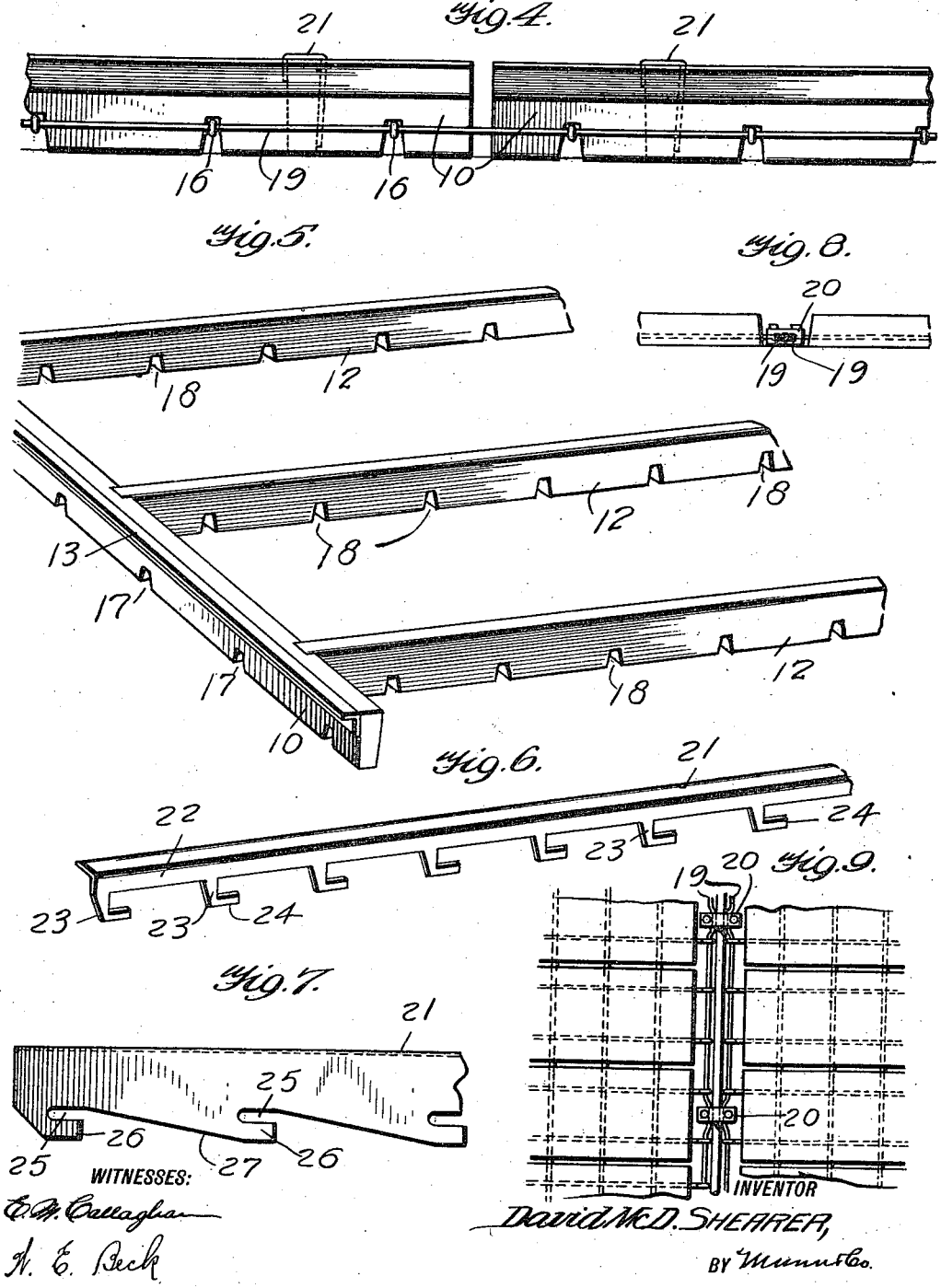

UNITED STATES PATENT OFFICE.

DAVID McDOUGALD SHEARER, OF VICKSBURG, MISSISSIPPI.

REVETMENT-MOLD.

1,173,880.  Specification of Letters Patent.  Patented Feb. 29, 1916.

Application filed August 20, 1915. Serial No. 46,501.

*To all whom it may concern:*

Be it known that I, DAVID McD. SHEARER, a citizen of the United States, and a resident of Vicksburg, in the county of Warren and State of Mississippi, have invented an Improvement in Revetment-Molds, of which the following is a specification.

The present invention is an improvement in molding apparatus and has particular reference to the formation of revetment mats for the protection of river banks and the like, whereby to prevent erosion thereof.

An object of the invention is the provision of a mold particularly designed for use in connection with the formation of the revetment mat embodied in my copending application Serial No. 879,644, said mold including novel means for supporting a reinforcing fabric or bonding wires therein about which the several blocks of the mat are cast, said blocks being spaced in order that the mat will be rendered flexible.

Another object is to provide a mold in which large quantities of block units may be formed at one operation and which may be easily removed when one section of blocks has set or cured sufficiently and another section superimposed thereon, a layer of paper being interposed between each section to prevent adhesion.

The mold contemplated by the invention is of extreme simplicity in construction and therefore easy to manufacture and is also durable, and effective in carrying out the purpose for which it is designed.

The inventive idea involved is capable of receiving a variety of mechanical expressions, some of which, for the purpose of illustrating the invention, are shown in the accompanying drawings, in which—

Figure 1 is a fragmentary top plan view of the mold constructed in accordance with the invention. Fig. 2 is a transverse section on the line 2—2 of Fig. 1. Fig. 3 is a fragmentary enlarged view similar to Fig. 2. Fig. 4 is a fragmentary side elevation. Fig. 5 is a fragmentary perspective view of the longitudinal and transverse members of the mold. Fig. 6 is a detail perspective of one form of fabric supporting device for the mold. Fig. 7 is a fragmentary side elevation of another embodiment of fabric supporting device. Fig. 8 is a detail view showing the manner of joining the blocks together. Fig. 9 is a top plan view thereof.

It has been found, in practice, that the most practical manner of laying my revetment mats has been to construct a section of any desired size on the deck of a barge used for the purpose of transportation and after the first sections have cured sufficiently a layer of sections is superimposed thereon and separated therefrom so as to prevent adhesion. As many unit sections as desired may be formed and the same then transported to the site of ultimate use and there connected and placed in position from the deck of the barge by suitable apparatus and in this manner minimize the amount of labor in handling. To this end the invention contemplates providing a mold comprising longitudinal side members 10 arranged in parallel relation and provided upon their inner side faces with a plurality of notches 11 which are adapted to receive the ends of the transverse members 12 of the mold. The side members 10 are provided longitudinally thereof with grips 13 whereby removal of the side members from engagement with the block may be facilitated. The inner side faces of the members 10 are beveled downwardly and outwardly as indicated at 14 so that the bottoms of said members are narrower than the tops thereof. These side members are beveled so that when one section of mat is superimposed upon another the bottom edge of the uppermost section will project slightly beyond the top edge of the under section in order that the form may readily disengage itself from the fragile, green concrete, when being removed. Grease is also applied to the forms to assist in obtaining this result.

The several block components of each section of mat may be reinforced by longitudinal and transverse bonding wires 15 and 16, respectively, which extend through and are supported in recesses 17 and 18 formed in the bottoms of the longitudinal and transverse members 10 and 12, respectively. Each end of the transverse wires 16 is secured to a supporting wire 19 which extends longitudinally of the side members 10 on the outside thereof, said wires 19 being secured together by means of bolted clips 20, as specifically described in the co-pending application mentioned above, for the purpose of forming a complete flexible mat. The transverse wires 16 pass above the longitudinal wires 15 and are welded thereto, the latter wires being held in position by means of the wire supporting devices 21 which form one of the essential features of the present invention. These devices are adapted to be detachably mounted upon the transverse members 12 of the mold frame and each comprises a body portion 22 of substantially inverted L-shaped formation and adapted to slide along the top of the member 12. Arranged at intervals and longitudinally of one edge of each of the devices 21 are a plurality of depending lugs 23 having lateral extensions 24 at their lower ends which combine with the main portions of the lugs to form stirrups for receiving the longitudinal wires 15 thereon. A slight modification of the construction just described is illustrated in Fig. 7 of the drawings wherein the device 21′ has provided in one of its bottom edges a plurality of spaced slots 25 which extend in parallel relation to the top edge of the device, said slots being formed by the lugs 26 and by inclining the said bottom edge of the device as indicated at 27. These devices are usually stamped or cut out of light sheet metal.

In practice, after the concrete or other plastic material of which the revetment blocks are formed has been poured into the mold and before the same has become set, the wire supporting devices are moved longitudinally of the transverse members 12 in order to disengage the same from said wires and are then lifted out of the frame, whereupon the concrete will be free to set around these wires and thus be reinforced thereby. When the section of the mat has been sufficiently cured the frame of the material may be removed after which a layer of greased paper may be spread over said section and another section cast and superimposed on the first-mentioned section.

What is claimed is:—

1. A revetment mold comprising a frame including spaced longitudinal and transverse members having recesses in the bottoms thereof, said longitudinal members having their inner faces beveled, a detachable device for supporting bonding wires carried by each of said transverse members and including a substantially L-shaped body portion, one edge of said device being provided with a plurality of lugs forming slots for the reception of certain of said wires.

2. A revetment mold comprising a frame including spaced longitudinal and transverse members having recesses in the bottoms thereof, a detachable device for supporting bonding wires carried by each of said transverse members and including a substantially L-shaped body, one edge of said device being provided with a plurality of lugs forming slots for the reception of certain of said wires.

3. A revetment mold comprising an open frame consisting of spaced longitudinal and transverse members, said longitudinal members having their inner faces inclined downwardly and outwardly, and bonding wire supporting devices carried by said transverse members.

4. A revetment mold comprising a frame consisting of longitudinal and transverse members, said longitudinal members having their inner faces beveled, and bonding wire supporting devices carried by said transverse members and adjustable longitudinally thereof.

5. A revetment mold comprising a frame, and bonding wire supporting devices detachably supported upon certain members of said frame and movable longitudinally thereof whereby to detach the same from the bonding wires.

6. A revetment mold comprising a frame, and bonding wire supporting devices carried thereby, each including a body portion having depending therefrom a plurality of lugs coöperating with the body portion to form slots for the reception of the bonding wires.

7. A revetment mold comprising a frame including longitudinal and transverse members having notches in the bottom thereof, and means detachably connected to certain of the members of said frame and movable longitudinally thereof and adapted to detachably support a fabric reinforcement in said notches.

8. A revetment mold comprising a frame including longitudinal and transverse members, and wire supporting devices detachably carried by certain of said members and movable longitudinally thereof.

DAVID McDOUGALD SHEARER.

Witnesses:
S. F. SCUDDER,
FRED CHIED.